(12) United States Patent
Park

(10) Patent No.: US 7,506,109 B2
(45) Date of Patent: Mar. 17, 2009

(54) RECORDING MEDIUM HAVING DATA STRUCTURE FOR MANAGING AT LEAST A DATA AREA OF THE RECORDING MEDIUM AND RECORDING AND REPRODUCING METHODS AND APPARATUSES

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 504 days.

(21) Appl. No.: 10/840,372

(22) Filed: May 7, 2004

(65) Prior Publication Data

US 2005/0022072 A1 Jan. 27, 2005

Related U.S. Application Data

(60) Provisional application No. 60/469,006, filed on May 9, 2003.

(30) Foreign Application Priority Data

May 23, 2003 (KR) ...................... 10-2003-0033008

(51) Int. Cl.
*G06F 12/00* (2006.01)
(52) U.S. Cl. ..................................... 711/154
(58) Field of Classification Search ....................... None
See application file for complete search history.

(56) References Cited

U.S. PATENT DOCUMENTS

| 4,558,446 | A | | 12/1985 | Banba et al. |
|---|---|---|---|---|
| 4,733,386 | A | | 3/1988 | Shimoi |
| 4,807,205 | A | | 2/1989 | Picard |
| 4,963,866 | A | | 10/1990 | Duncan |
| 5,068,842 | A | | 11/1991 | Naito |
| 5,111,444 | A | | 5/1992 | Fukushima et al. |
| 5,210,734 | A | | 5/1993 | Sakurai |
| 5,235,585 | A | | 8/1993 | Bish et al. |
| 5,237,553 | A | * | 8/1993 | Fukushima et al. ...... 369/53.17 |
| 5,247,494 | A | | 9/1993 | Ohmo et al. |
| 5,319,626 | A | | 6/1994 | Ozaki et al. |
| 5,404,357 | A | | 4/1995 | Ito et al. |
| 5,442,611 | A | | 8/1995 | Hosaka |
| 5,448,728 | A | | 9/1995 | Takano et al. |
| 5,475,820 | A | * | 12/1995 | Natrasevschi et al. ....... 711/100 |
| 5,481,519 | A | | 1/1996 | Hosoya |
| 5,495,466 | A | | 2/1996 | Dohmeier et al. |

(Continued)

FOREIGN PATENT DOCUMENTS

CN 1134017 10/1996

(Continued)

OTHER PUBLICATIONS

PCT International Search Report dated Sep. 6, 2004.

(Continued)

*Primary Examiner*—Pierre-Michel Bataille
*Assistant Examiner*—Ryan Dare
(74) *Attorney, Agent, or Firm*—Harness, Dickey & Pierce

(57) ABSTRACT

The data structure on the recording medium includes a temporary defect management area storing a data block. The data block includes a temporary definition structure. The temporary definition structure indicates a recording mode of the recording medium.

34 Claims, 11 Drawing Sheets

U.S. PATENT DOCUMENTS

| | | | |
|---|---|---|---|
| 5,528,571 A | 6/1996 | Funahashi et al. | |
| 5,553,045 A | 9/1996 | Obata | |
| 5,577,194 A | 11/1996 | Wells et al. | |
| 5,608,715 A | 3/1997 | Yokogawa et al. | |
| 5,715,221 A | 2/1998 | Ito et al. | |
| 5,720,030 A | 2/1998 | Kamihara et al. | |
| 5,732,053 A | 3/1998 | Yano et al. | |
| 5,740,435 A * | 4/1998 | Yamamoto et al. | 707/205 |
| 5,745,444 A | 4/1998 | Ichikawa et al. | |
| 5,799,212 A | 8/1998 | Ohmori | |
| 5,802,028 A | 9/1998 | Igarashi | |
| 5,805,536 A | 9/1998 | Gage et al. | |
| 5,848,038 A | 12/1998 | Igarashi | |
| 5,867,455 A | 2/1999 | Miyamoto et al. | |
| 5,878,020 A | 3/1999 | Takahashi | |
| 5,914,928 A | 6/1999 | Takahashi | |
| 6,058,085 A | 5/2000 | Obata | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 | 9/2001 | Ito et al. | |
| 6,341,109 B1 | 1/2002 | Kayanuma | |
| 6,341,278 B1 * | 1/2002 | Yamamoto et al. | 707/2 |
| 6,373,800 B1 | 4/2002 | Takahashi | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko | |
| 6,469,978 B1 | 10/2002 | Ohata et al. | |
| 6,477,126 B1 | 11/2002 | Park et al. | |
| 6,480,446 B1 | 11/2002 | Ko | |
| 6,493,301 B1 | 12/2002 | Park | |
| 6,529,458 B1 | 3/2003 | Shin | |
| 6,542,450 B1 | 4/2003 | Park | |
| 6,564,345 B1 | 5/2003 | Kim et al. | |
| 6,581,167 B1 | 6/2003 | Gotoh et al. | |
| 6,594,209 B2 | 7/2003 | Ijtsma et al. | |
| 6,606,285 B1 | 8/2003 | Ijtsma et al. | |
| 6,615,363 B1 | 9/2003 | Fukasawa | |
| 6,631,106 B1 | 10/2003 | Numata et al. | |
| 6,633,724 B1 | 10/2003 | Hasegawa et al. | |
| 6,667,939 B1 | 12/2003 | Miyamoto | |
| 6,671,249 B2 | 12/2003 | Horie | |
| 6,697,306 B2 | 2/2004 | Sako | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama | |
| 6,766,418 B1 | 7/2004 | Alexander et al. | |
| 6,788,631 B1 | 9/2004 | Park et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki | |
| 6,934,236 B2 | 8/2005 | Lee et al. | |
| 6,999,398 B2 | 2/2006 | Yamamoto et al. | |
| 7,002,882 B2 | 2/2006 | Takahashi | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1 | 11/2001 | Ito et al. | |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 * | 9/2002 | Ito et al. | 369/53.36 |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 * | 11/2002 | Ko et al. | 369/53.21 |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0223427 A1 | 11/2004 | Kim et al. | |
| 2004/0246851 A1 * | 12/2004 | Hwang et al. | 369/53.16 |
| 2005/0007910 A1 | 1/2005 | Ito et al. | |
| 2005/0008346 A1 | 1/2005 | Noguchi et al. | |
| 2005/0025007 A1 | 2/2005 | Park | |
| 2005/0047294 A1 | 3/2005 | Park | |
| 2005/0050402 A1 | 3/2005 | Koda et al. | |
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |
| 2006/0195719 A1 | 8/2006 | Ueda et al. | |
| 2006/0203635 A1 | 9/2006 | Ko et al. | |

| | | | | | | |
|---|---|---|---|---|---|---|
| 2006/0203638 | A1 | 9/2006 | Ko et al. | JP | 2001-357623 | 12/2001 |
| 2006/0203684 | A1 | 9/2006 | Ko et al. | JP | 2002-015507 | 1/2002 |
| 2006/0227694 | A1 | 10/2006 | Woerlee et al. | JP | 2002-015525 | 1/2002 |
| 2007/0294571 | A1 | 12/2007 | Park et al. | JP | 2002-056619 | 2/2002 |
| 2008/0046780 | A1 | 2/2008 | Shibuya et al. | JP | 2002-215612 | 8/2002 |

FOREIGN PATENT DOCUMENTS

| | | | | | |
|---|---|---|---|---|---|
| CN | 1140897 | 1/1997 | JP | 2002-245723 | 8/2002 |
| CN | 1227950 | 9/1999 | JP | 2002-288938 | 10/2002 |
| CN | 1273419 | 11/2000 | JP | 2002-329321 | 11/2002 |
| CN | 1675708 | 9/2005 | JP | 2002-352522 | 12/2002 |
| CN | 1685426 | 10/2005 | JP | 2004-280864 | 10/2004 |
| DE | 199 54 054 | 6/2000 | JP | 2004-280865 | 10/2004 |
| EP | 0 314 186 | 5/1989 | JP | 2005-004912 | 1/2005 |
| EP | 0 325 823 | 8/1989 | JP | 2005-535993 | 11/2005 |
| EP | 0 350 920 | 1/1990 | JP | 2005-538490 | 12/2005 |
| EP | 0 464 811 A2 | 1/1992 | JP | 2005-538491 | 12/2005 |
| EP | 0 472 484 | 2/1992 | JP | 2006-519445 | 8/2006 |
| EP | 0 477 503 | 4/1992 | KR | 10-2004-0094301 | 11/2004 |
| EP | 0 556 046 | 8/1993 | TW | 371752 | 10/1999 |
| EP | 0 871 172 | 10/1998 | TW | 413805 | 12/2000 |
| EP | 0 908 882 | 4/1999 | WO | WO 84/00628 | 2/1984 |
| EP | 0 974 967 | 1/2000 | WO | WO 96/30902 | 10/1996 |
| EP | 0 989 554 | 3/2000 | WO | WO 97/22182 | 6/1997 |
| EP | 0 997 904 | 5/2000 | WO | WO 00/54274 | 9/2000 |
| EP | 1 026 681 | 8/2000 | WO | WO 01/22416 | 3/2001 |
| EP | 1 043 723 | 10/2000 | WO | WO 01/93035 | 12/2001 |
| EP | 1 132 914 | 9/2001 | WO | WO 03/007296 | 1/2003 |
| EP | 1 148 493 | 10/2001 | WO | WO 03/025924 | 3/2003 |
| EP | 1 152 414 | 11/2001 | WO | WO 03/079353 | 9/2003 |
| EP | 1 239 478 | 9/2002 | WO | WO 2004/015707 | 2/2004 |
| EP | 1 274 081 | 1/2003 | WO | WO 2004/015708 | 2/2004 |
| EP | 1 298 659 | 4/2003 | WO | WO 2004/025648 | 3/2004 |
| EP | 1 329 888 | 7/2003 | WO | WO 2004/025649 | 3/2004 |
| EP | 1 347 452 | 9/2003 | WO | WO 2004/029668 | 4/2004 |
| EP | 1 564 740 | 8/2005 | WO | WO 2004/029941 | 4/2004 |
| EP | 1 612 790 | 1/2006 | WO | WO 2004/034396 | 4/2004 |
| GB | 2 356 735 | 5/2001 | WO | WO 2004/036561 | 4/2004 |
| JP | 63-091842 | 4/1988 | WO | WO 2004/053872 | 6/2004 |
| JP | 1-263955 | 10/1989 | WO | WO 2004/053874 | 6/2004 |
| JP | 2-023417 | 1/1990 | WO | WO 2004/068476 | 8/2004 |
| JP | 5-274814 | 10/1993 | WO | WO 2004/075180 | 9/2004 |
| JP | 6-349201 | 12/1994 | WO | WO 2004/079631 | 9/2004 |
| JP | 8-096522 | 4/1996 | WO | WO 2004/079731 | 9/2004 |
| JP | 9-145634 | 6/1997 | WO | WO 2004/079740 | 9/2004 |
| JP | 9-231053 | 9/1997 | WO | WO 2004/081926 | 9/2004 |
| JP | 10-050005 | 2/1998 | WO | WO 2004/093035 | 10/2004 |
| JP | 10-050032 | 2/1998 | WO | WO 2004/100155 | 11/2004 |
| JP | 10-187356 | 7/1998 | WO | WO 2004/100156 | 11/2004 |
| JP | 10-187357 | 7/1998 | WO | WO 2005/004123 | 1/2005 |
| JP | 10-187358 | 7/1998 | WO | WO 2005/004154 | 1/2005 |
| JP | 10-187359 | 7/1998 | | | |
| JP | 10-187360 | 7/1998 | | | |
| JP | 10-187361 | 7/1998 | | | |
| JP | 11-110888 | 4/1999 | | | |
| JP | 11-203792 | 7/1999 | | | |
| JP | 2000-090588 | 3/2000 | | | |
| JP | 2000-149449 | 5/2000 | | | |
| JP | 2000-195178 | 7/2000 | | | |
| JP | 2000-215612 | 8/2000 | | | |
| JP | 2000-285607 | 10/2000 | | | |
| JP | 2001-023317 | 1/2001 | | | |
| JP | 2001-069440 | 3/2001 | | | |
| JP | 2001-110168 | 4/2001 | | | |
| JP | 2001-351334 | 12/2001 | | | |

OTHER PUBLICATIONS

"JIS Handbook Data Processing for Hardware," Japanese Standards Association Inc., Japan, Apr. 21, 1999, pp. 1064-1070.

International Search Report and Written Opinion dated Aug. 31, 2004.

International Search Report and Written Opinion dated Jan. 13, 2006.

International Search Report and Written Opinion dated Mar. 8, 2007.

Search Report for corresponding European Application No. 07110035.8 dated Jun. 5, 2008.

Office Action for corresponding Russian Application No. 2006104619/28 dated Jun. 26, 2008.

Office Action for corresponding Taiwanese Application No. 09720450190 dated Aug. 25, 2008.

* cited by examiner

* Recording mode
  · 0000 0000b : Sequential Recording
  · 0000 0001b : Random Recording

*LRA : Last Recorded Address

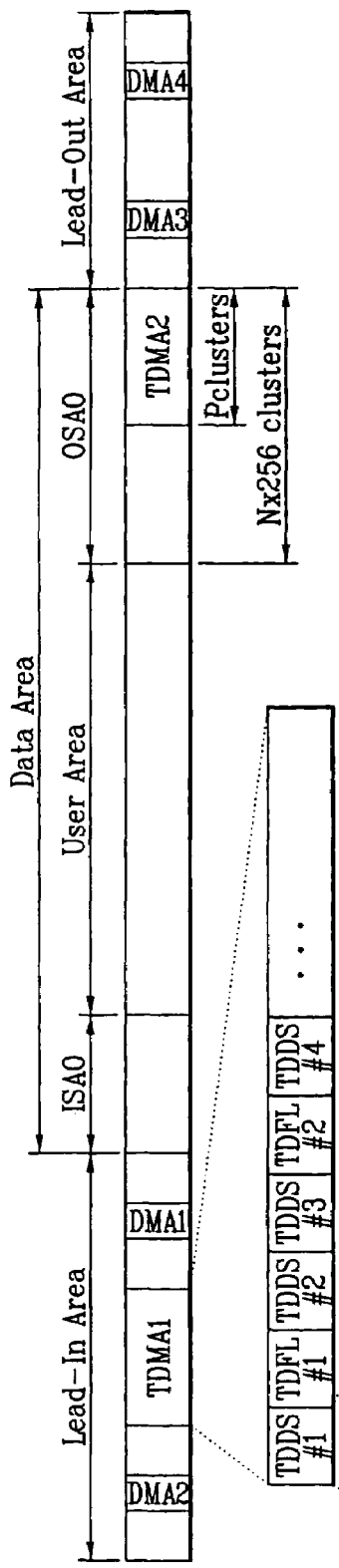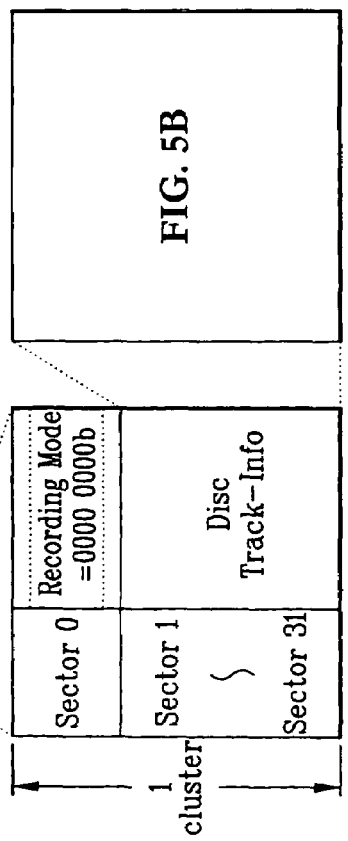
FIG. 5A
FIG. 5B
* Sequential Recording Mode
* DMA : Defect Management Area
* TDMA : Temporary DMA
* ISA : Inner Spare Area
* OSA : Outer Spare Area
* TDFL : Temporary Defect List
* TDDS : Temporary Disc Definition Structure

FIG. 5B

| Byte position in Data Frame | Contents | | number of bytes |
|---|---|---|---|
| 0 | | Track Info Structure identifier | 2 |
| 2 | Track Info Header | Track Info format = 00h | 1 |
| 3 | | reserved and set to 00h | 1 |
| 4 | | Layer number (0 or 1) | 4 |
| 8 | | Total number of tracks | 4 |
| 12 | | Total number of open tracks | 4 |
| 16 | List of Track Info | | n * 8 |
| n * 8 | Track Info List Terminator | | |
| | Reserved and set to 00h | | |

| b₆₃ ‥ b₆₀ | b₅₉ ‥ b₃₂ | b₃₁ ‥ b₂₈ | b₂₇ ‥ b₀ |
|---|---|---|---|
| Track status | Start PSN of Track #n | reserved | LRA of Track #n |
| Track status | Start PSN of Track #n+1 | reserved | LRA of Track #n+1 |
| Track status | Start PSN of Track #n+2 | reserved | LRA of Track #n+2 |
| ... | ... | ... | ... |

Track Status
0000b : Open Track
1000b : Complete Track
0001b : Intermediate Track

* DMA : Defect Management Area
* TDMA : Temporary DMA
* ISA : Inner Spare Area
* OSA : Outer Spare Area
* TDFL : Temporary Defect List
* TDDS : Temporary Disc Definition Structure
* SBM : Space-Bitmap

FIG. 7B

| | contents | Number of Bytes |
|---|---|---|
| SBM Header | Un-allocated Space Bitmap Identifier = "UB" | 2 |
| | Format Version = 00h | 1 |
| | Reserved, 00h | 1 |
| | Layer Number (0 or 1) | 4 |
| | Reserved, 00h | R |
| SBM Info | SBM for inner Area | |
| |    Start Cluster First PSN | 4 |
| |    Length in inner area | 4 |
| |    Bitmap Data | M |
| |    Reserved, 00h | 4 |
| | SBM for inner spare Area | |
| |    Start Cluster First PSN | 4 |
| |    Length in inner spare area | 4 |
| |    Bitmap Data | N |
| |    Reserved, 00h | 4 |
| | SBM for User Area | |
| |    Start Cluster First PSN | 4 |
| |    Length in user area | 4 |
| |    Bitmap Data | O |
| |    Reserved, 00h | 4 |
| | SBM for outer spare Area | |
| |    Start Cluster First PSN | 4 |
| |    Length in outer spare area | 4 |
| |    Bitmap Data | P |
| |    Reserved, 00h | 4 |
| | SBM for Outer Area | |
| |    Start Cluster First PSN | 4 |
| |    Length in outer area | 4 |
| |    Bitmap Data | Q |
| |    Reserved, 00h | 4 |
| SBM Terminator | | |

US 7,506,109 B2

RECORDING MEDIUM HAVING DATA STRUCTURE FOR MANAGING AT LEAST A DATA AREA OF THE RECORDING MEDIUM AND RECORDING AND REPRODUCING METHODS AND APPARATUSES

FOREIGN PRIORITY

The present invention claims priority under 35 U.S.C. 119 on U.S. Provisional Application No. 60/469,006 filed on May 9, 2003 and Korean Application No. 10-2003-033008 filed on May 23, 2003; the contents of which are incorporated by reference in their entirety.

BACKGROUND OF THE INVENTION

1. Field of the Invention

The present invention relates to a recording medium having a data structure for managing at least a data area of the recording medium as well as methods and apparatuses for reproduction and recording.

2. Description of the Related Art

The standardization of new high-density read only and rewritable optical disks capable of recording large amounts of data has been progressing rapidly and new optical disk related products are expected to be commercially available in the near future. For example, the blu-ray disc (BD), which belongs to the next-generation HD-DVD technology, is the next-generation optical recording solution that can strikingly surpass the data recording capability of existing DVDs.

Recording on and reading from a BD uses a celadon laser having a wavelength of 405 nm, which is much denser than a red laser having a wavelength of 650 nm used with existing DVDs. Thus, a greater amount of data may be stored on BD than on existing DVDs.

While at least one standard related to the BD (Blu-ray Disc) has been developed, such as BD-RE (BD Rewritable disc), many other standards such as BD-WO (BD Write Once disc) are still in development. Standards such as BD-RE provide a data structure for managing defects in the data area of the recording medium. However, the BD-WO, because of its write-once nature, presents challenges not faced by existing BD standards such as BD-RE, and an effective data structure and method of managing defects is still under development for the BD-WO standard.

SUMMARY OF THE INVENTION

The recording medium according to the present invention includes a data structure for managing at least a data area of the recording medium.

In one exemplary embodiment, a temporary defect management area of the recording medium stores a data block. The data block includes a temporary definition structure, and the temporary definition structure indicates a recording mode of the recording medium. For example, the recording mode may be one of sequential recording and random recording.

The data block may also include use status information for a data area of the recording medium. The use status information provides information on use of the data area to store data. When the recording mode is sequential recording, the data block includes sequential recording information providing information on continuous recording areas in a data area of the recording medium. When the recording mode is random recording, the data block includes a space bit map indicating recordation status of a data area of the recording medium.

Another example embodiment of the present invention provides a method of formatting a write-once recording medium. In this method, input related to a desired recording mode for the recording medium is received, and an indicator of the desired recording mode is recorded in a temporary definition structure in a temporary defect management area of the recording medium. For example, the desired recording mode may be one of a sequential recording mode and a random recording mode. The method may further include recording sequential recording information in the temporary defect management area when the recorded recording mode indicator indicates a sequential recording mode. The sequential recording information providing information on continuous recording areas in a data area of the recording medium. The method may also further includes recording a space bit map in the temporary defect management area when the recorded recording mode indicator indicates a random recording mode. The space bit map provides information on a recordation status of a data area of the recording medium, when the recorded recording mode indicator indicates a random recording mode.

A further example embodiment of the present invention provides a method of recording management information on a write-once recording medium. In this embodiment, a recording mode indicator is reproduced from a temporary definition structure in a temporary defect management area of the recording medium, and a recording mode of the recording medium is judged based on the recording mode indicator. Then, use status information for the recording medium is recorded in the temporary defect management area based on the judging step. The use status information provides information on use of a data area of the recording medium to store data.

A still further example embodiment of the present invention provides a method of recording management information on a write-once recording medium. In this embodiment, use status information is updated by recording updated use status information in a temporary defect management area of the recording medium when an event occurs. The use status information provides information on use of a data area of the recording medium to store data.

In another example embodiment of the present invention, a temporary defect management area of the recording medium stores a plurality of different sized defect lists. Each defect list indicates defects in a data area of recording layers of the recording medium at a time when the defect list was recorded. The temporary defect management area also stores a plurality of fixed sized temporary definition structures. Each temporary definition structure provides use status information on a data area of one layer of the recording medium at a time when the temporary definition structure was recorded.

A further example embodiment of the present invention provides a method of recording management information on a write-once recording medium. In this embodiment at least one defect list is recorded in a temporary defect management area. The defect list lists defects in data areas of recording layers of the recording medium. The recorded defect list includes new defects as compared to a previously recorded defect list such that the recorded defect list and previously recorded defect list have different sizes. This embodiment further includes recording at least one temporary definition structure in the temporary defect management area. Each temporary definition structure provides use status information on a data area of one layer of the recording medium at a time when the temporary definition structure was recorded. The recorded temporary definition structure consumes a same amount of space on the recording medium as a previously recorded temporary definition structure.

A still further example embodiment of the present invention provides a method of recording management information on a write-once recording medium having a temporary defect management area in which are stored at least one temporary definition structure associated with each recording layer of the recording medium. Each temporary definition structure includes use status information providing information on use of a data area in the associated recording layer to store data. The method includes recording, in a defect management area of the recording medium, a most current temporary definition structure associated with each recording layer.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which:

FIGS. 5A and 5B illustrate a data structure of the write-once optical disc, and more specifically, the temporary disc management information according to an embodiment of the present invention;

DESCRIPTION OF THE EMBODIMENTS

In order that the invention may be fully understood, exemplary embodiments thereof will now be described with reference to the accompanying drawings. For convenience, a write-once optical Blu-ray disc will be used as an example of a write-once recording medium in the exemplary embodiments.

Data Structure of the Recording Medium

Figure 1:
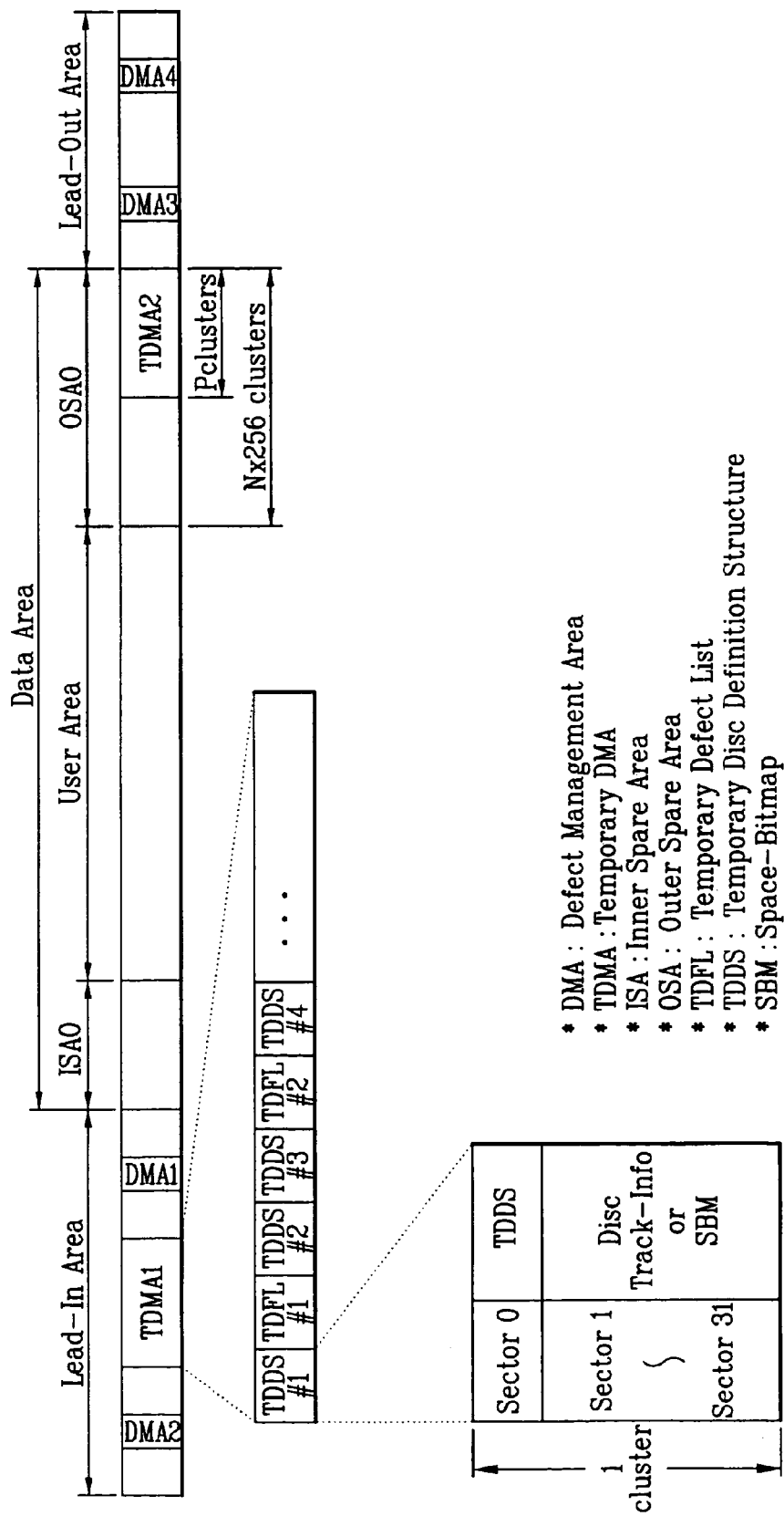
FIG. 1 illustrates a single-layer write once optical disc according to an example embodiment of the present invention.
Figure 2:
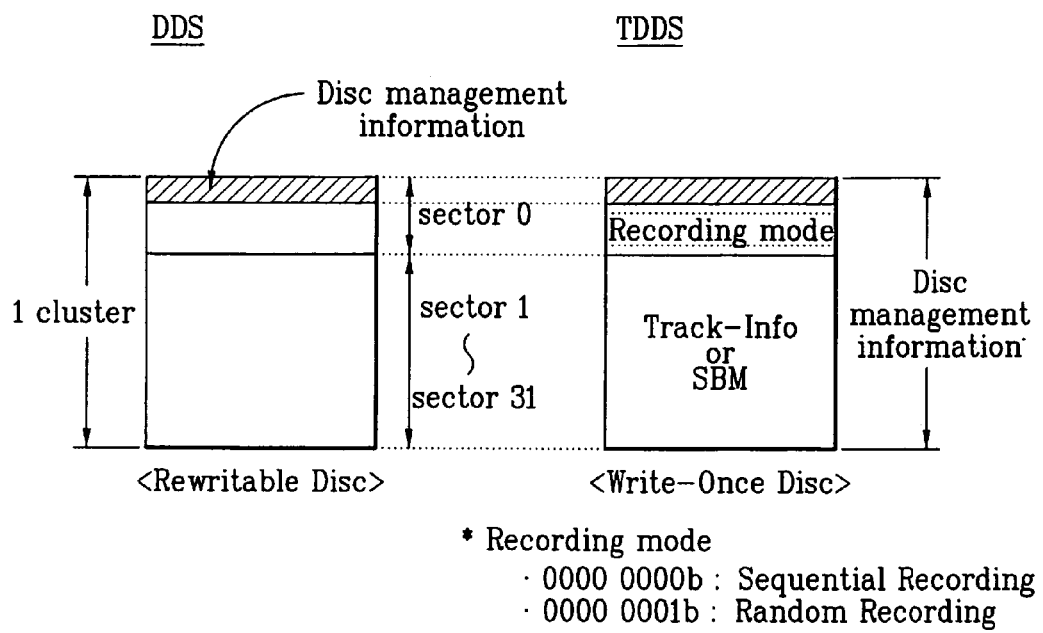
FIG. 2 illustrates a comparison of the disc management information of a conventional rewritable optical disc to the disc management information of the present invention.

FIGS. 1 and 2 illustrate a data structure of the write-once optical disc, and more specifically, temporary disc management information according to an embodiment of the present invention. The configuration of the write-once optical disc shown in FIG. 1 is described in detail in Korea Patent Application no. 2003-15634.

As shown, the write-once optical disc in this example is a single layer disc that has one recording layer. The disc includes spare areas (ISA0/ISA1) for recording data the could not be recorded in the main data area because of defects in the main data area (e.g., physical defects). Information for managing the replacement of defective portions of the data area with portions of the spare area is recorded in a temporary defect management area or areas (TDMA).

In general, a rewritable, as opposed to a write-once, optical disc has a limited defect management area (DMA) because data can be written and erased from the DMA repeatedly. A write-once optical disc needs a larger amount of space to manage defects since data can be written only once and not erased. Accordingly, the TDMA is used for recording the defect management information as this information changes during use of the optical disc. Once the disc is complete, the last version of the defect management information is copied from the TDMA to a DMA on the write-once optical disc.

Referring to FIG. 1, the TDMA includes TDMA1 allocated to a lead-in area having a fixed size and TDMA2 allocated to spare area OSA0. The TDMA2 has a size interworking with the size of the spare area. For example, the size of the spare area OSA0 is N*256 cluster, of which the TDMA2 forms P clusters. The number of clusters P may be determined according to the expression $P=(N*256)/4$. In each TDMA, temporary defect management information in the form of a temporary defect list (TDFL), a temporary disc definition structure (TDDS), and disc use status information may be recorded.

As discussed above, when a defect area exists in the data area, a spare area (ISA0/OSA0) is substituted for the defect area. The TDFL provides information to manage this process in the form of a list. For example, the list indicates the defect area and the spare area replacing the defect area. According to one embodiment of the present invention, the size of the TDFL, varies from 1 to 4 clusters depending on the amount of information in the TDFL. By contrast, according to one example embodiment of the present invention, the amount of space devoted to the TDDS remains fixed at one cluster. According to this embodiment, this data block includes the TDDS and disc usage status information as discussed in detail below with respect to FIGS. 2, 5A-5B and 7A-7B. As will be discussed in greater detail below, the disc usage status information may be sequential recording information (e.g., track information) or a space bit map depending on a recording mode of the write-once optical disc.

Referring first to FIG. 2, the disc management information of the conventional rewritable optical disc will be compared with the contents included in the TDDS of the present invention.

In the case of a rewritable optical disk, the DDS consumes a very small portion of the disc—about 60 bytes of one cluster (one cluster having 32 sectors). The remaining area of the cluster is set by 'zero padding'. However, according to this embodiment of the present invention, the remaining area as well as the area (60 bytes) used in the conventional rewritable optical disk is used as disc management information. Accordingly, in the TDDS of the present invention, information particular to a write-once optical disc as well as DDS as used in the conventional rewritable optical disc is recorded sequentially in one sector (2048 bytes). For example, the information particular to the write-once optical disc includes a recording mode indicator indicating a recording mode of the recording medium from a plurality of possible recording modes. The recording modes and recording mode indicator are discussed in greater detail below. The information may also include position information of the latest TDFL.

As shown in FIGS. 1 and 2, disc use status information (e.g., sequential recording information such as track information or space bit map depending on the recording mode of the recording medium as discuss in detail below) is recorded on the remaining 31 sectors of one cluster that includes the TDDS. Alternatively, the disc use status information may be configured in 31 sectors in the front of TDDS and the TDDS may be configured on the last, $32^{nd}$ sector. The disc use status information changes according to use by the user of the disc, and, as discussed in detail below, provides information that may be used to accurately search for an additional recordable area through discrimination of recorded/non-recorded area information.

Accordingly, the TDDS as used in this disclosure should be construed broadly as described above and not as a term defined according to one particular standard.

Recording Mode and Initialization Method

Figure 3:
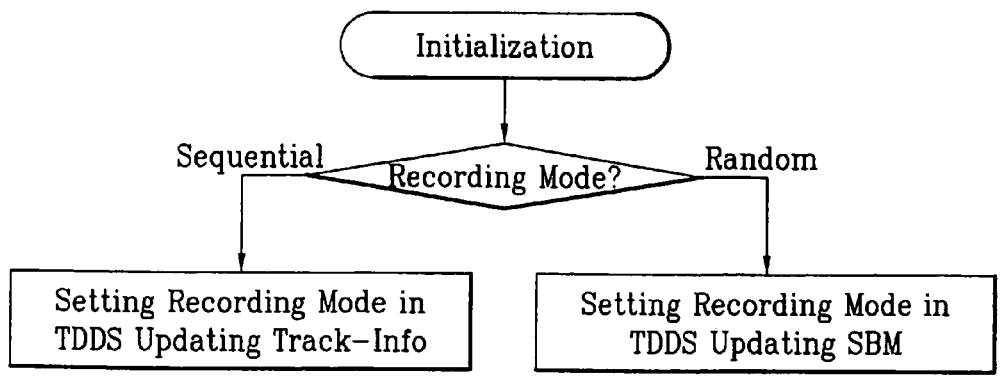
FIG. 3 illustrates an optical disc initializing method based on recording mode according to an embodiment of the present invention.

FIG. 3 illustrates an optical disc initializing method based on recording mode according to an embodiment of the present invention.

As described above, the present invention intends to support diverse recording methods even with respect to the optical disc write once, and the methods are a 'sequential recording mode' and a 'random recording mode'.

The 'sequential recording mode' is a recording mode which includes a DAO (Disc At Once) mode for recording at once the whole disc adopted by the related art optical disc write once standards and an incremental recording mode for sequentially recording information in continuous recording areas of the disc. In the sequential recording mode of the present invention, the number of additional recordable areas in the disc is not limited in the incremental recording mode. A continuous recording in which data is sequentially recorded will be referred to as a track in this disclosures, and the sequential recording information may be referred to as track information. This track information will be discussed in detail below.

The 'random recording mode' is a recording mode that enables free recording over the whole area of the disc. That is, this mode does not limit the order of recording data on the recording area of the disc. Here, a space bit map (SBM) is used as disc use status information to indicate the recordation status of the disc. This SBM will be discussed in more detail below.

As the present invention supports a plurality of recording modes as described above, when a write-once disc is first used, a determination of the recording mode is made, and the disc is initialized to the recording mode. That is, a user, disc manufacturer, or host (hereinafter collectively referred to as host) decides on the recording mode for the disc, and sets the recording mode in a specified management area of the disc. Specifically, if the host inputs the recording mode of the disc, the disc recording system sets one byte in the TDDS to indicate the recording mode and determines the format of the disc use status information associated with the recording mode. For example, if the recording mode is a sequential recording mode, the system sets the recording mode to '0000 0000b', and sets the 'track information' as the use status information. If the recording mode is a random recording mode, the system sets the recording mode to '0000 0001b', and sets the 'SBM' as the use status information. Accordingly, when the disc is used thereafter, the system records data on the disc according to the determined recording mode, and updates one of the corresponding use status information as the management information of the disc.

Consequently, if the initialization is completed and the disc write once is loaded, the system first judges the recording mode of the corresponding disc, determines one among the plurality of the disc use status information according to the recording mode judgment, and updates the determined use status information in the disc management area set in the corresponding disc.

Hereinafter, the detailed structure and recording method of the 'track information' and the 'SBM' managed in association with the recording mode in the TDDS will be explained, and then a method of recording the TDDS and the TDFL in the TDMA and the DMA will be explained.

Kinds of Tracks

Figure 4:
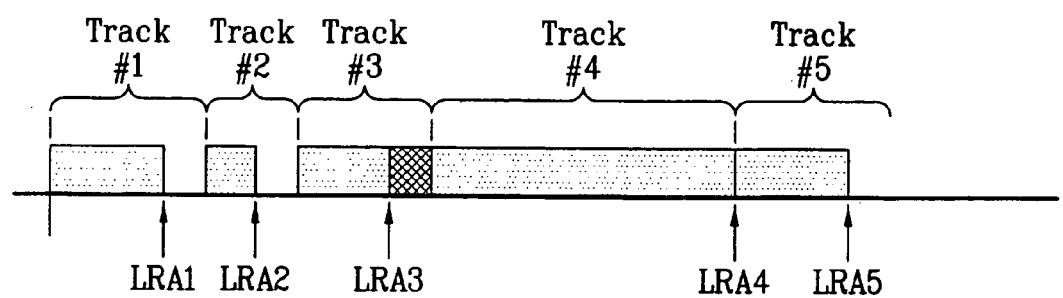
FIG. 4 illustrates the different kinds of basic tracks of a write-once optical disc according to an example embodiment of the present invention.

Referring to FIG. 4 the kinds of tracks and physical structure of the disc according to an example embodiment of the of the present invention will be described. A continuous recording area in which data is sequentially recorded will be referred to as a track in this disclosure. FIG. 4 illustrates the different kinds of basic tracks of a write-once optical disc according to an example embodiment of the present invention. More specifically, FIG. 4 illustrates a plurality of continuous recording areas or tracks having different status assuming use of the write-once disc over a period of time. As shown, tracks 1 and 2 correspond to open tracks that while storing data in a first area thereof, each have a later area on which additional recording is possible. The tracks 3 and 4 correspond to complete or closed tracks that are completely filled (track 4) or are closed for further recording (track 3). As shown by track 3, when a track having an unrecorded area is closed such that no further recording in the track is permitted, the unrecorded area is padded with zeros (shown as a hatched portion in FIG. 4) and changed to be a complete track. Track 3 is different from track 4 in that point.

Track 5 provides an example of the last track that includes an area on which additional recording is possible. This track is called an intermediate track. Accordingly, there are three kinds of tracks—open, closed and intermediate.

Each of the tracks has a last recorded address (LRA) regardless of the kind of the track. The LRA is the last address at which actual data was recorded in the track. Accordingly, with respect to track 3, the position (or address) before the track 3 was padded with zeros is the LRA for track 3 (LRA3). More specifically, assuming the unit for recording data on the optical disc is a cluster, and there are 32 sectors in one cluster, if less than the 32 sectors have data recorded therein, then the remaining sectors are padded with zeros. The last sector address before the padding is the LRA.

For each of the open and intermediate tracks, but not the closed tracks, a next writable address (NWA) indicating the next address into which data may be written may be determined. The NWA is obtained from the LRA as the next sector address following the LRA.

Data Structure of Track Information on the Recording Medium

First, the present invention does not limit the number of the open tracks. Accordingly, there may exist a plurality of open tracks and complete tracks. The present invention provides a data structure on the recording medium for managing this potential in an efficient manner. As shown in FIG. 5A, the recording mode indicator in the TDDS indicates the sequential recording mode and the disc use status information is track information. An embodiment of this track information data structure will now be described in detail with respect to FIG. 5B.

As shown, the sequential recording, or more particularly, the track information includes three parts: a header for indicating that the data structure provides track information, a track information list providing the track information, and an terminator indicating an end of the track information.

The header is positioned at the front portion of the track information and includes a 'track information structure identifier' field indicating that information following the identifier is track information. The next indicator 'track information format' indicates the format of the track information. This is followed by a 'layer number (0 or 1)' field representing the recording layer to which the track information corresponds. While the example thus far has been for a single sided, single recording layer write-once optical disc, the optical disc may have multiple recording layers and/or be double sided.

The header further includes a 'total number of tracks' field representing the number tracks in the data area of the recording layer to which the track information corresponds, and 'total number of open tracks' field representing the number of the open tracks in this data area. Before reading the track information list, the total track information may be confirmed.

The track information list is recorded after the header and will be described in greater detail below. The track information list terminator represents the end of the track information. Accordingly, the track information includes a header, track information list and a terminator recorded in series.

An example embodiment of the track information list will now be described in more detailed. The track information list includes one entry for each track in the corresponding data area of the disc. Each entry may be allocated to, for example, 8 bytes. This track information entry includes track status information, a first address of the corresponding track and the last recorded address information of the track.

The track status information indicates the kind of track—open, closed or intermediate, and may be represented by 4 bits as shown in FIG. 3B. In this embodiment of the present invention, an open track in which additional recording is possible is indicated by '0000b' as the track status information. An intermediate track is indicated by '0001b' as the track status information, and a complete track, in which additional recording is not permitted, is indicated by '1000b' as the track status information. The track status information is represented as specific bits as described above to aid in sorting the track information list entries as described later in this disclosure.

In the example of FIG. 5B, the first address information of an entry is a 'start physical sector number (PSN) of track' field. This field provides the sector address of the first sector forming the track. The last recorded address information in the example of FIG. 5B is the LRA of the track. Accordingly, if one entry is read, the kind of track, the start position and LRA of the track may be determined.

The track status information in each entry may also include a session start bit (e.g., one of the bits in the track status information in each entry may be used as the session start bit). The session status indicates if the track is the first track or not the first track in a session. Here, the clustering of tracks into a group is called a session.

Space Bit Map Structure and Recording Method

Figure 6:
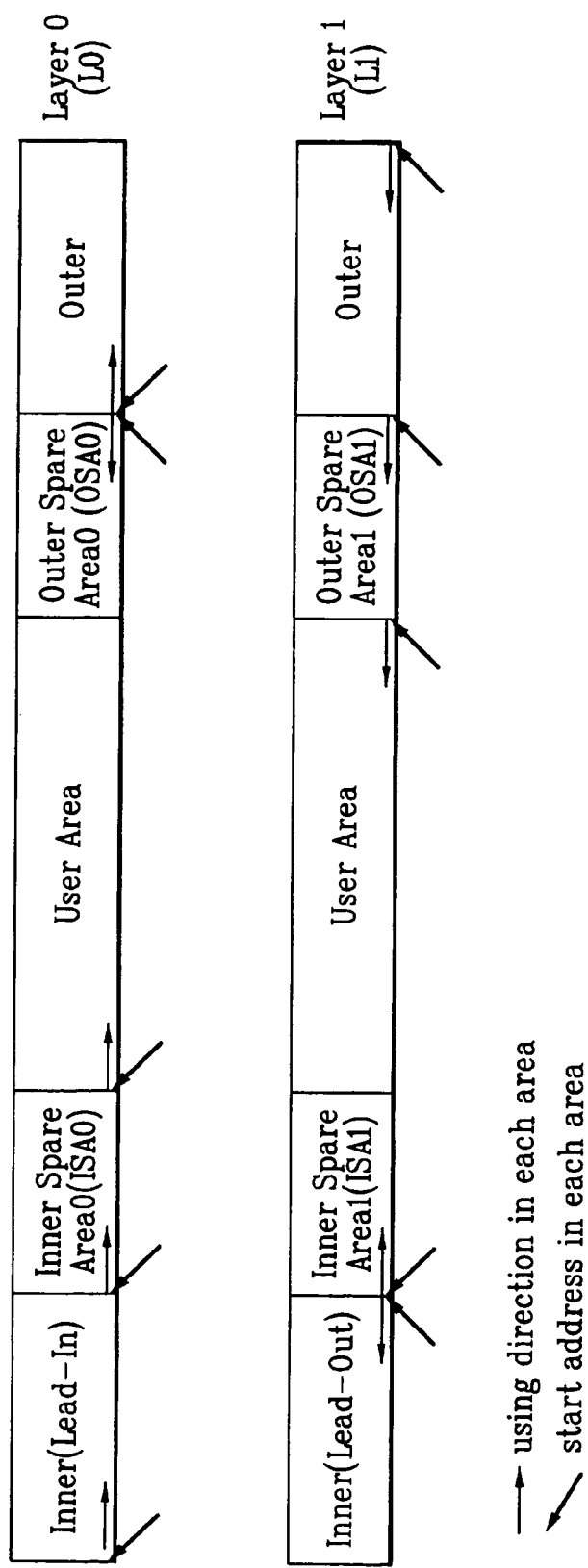
FIG. 6 schematically illustrates the direction in which the different areas of the optical disc are recorded.

FIG. 6 schematically illustrates the direction in which the different areas of the optical disc are recorded. This explanation will be helpful in understanding the data structure of the SBM described in detail below with respect to FIGS. 7A and 7B.

While FIG. 1 illustrated an example of a single layer optical disc, BD-WO may have a plurality of recording layers. As such, aspects of the single layer optical disc according to the present invention may be applied to both layers. For the purposes of explanation, FIG. 6 schematically illustrates a plurality of layers for the respective areas in an optical disc write once, such as a BD-WO.

In the BD-WO of FIG. 6, first and second recording layers Layer1 and Layer1 (hereinafter referred to as 'L0' and 'L1') may exist. The respective recording layers include an inner area, an inner spare area, a user area, an outer spare area, and an outer area. In the case of a dual-layer disc, the inner area of the first recording layer L0 becomes the lead-in area, and the inner area of the second recording layer L1 becomes the lead-out area. However, in the case of the single-layer disc, the outer area will be the read-out area.

FIG. 6 shows that the first recording layer L0 is used from the inner periphery to the outer periphery, and only the outer spare area OSA0 thereof is used from the outer periphery to the inner periphery. The second recording layer L1 is used from the outer periphery to the inner periphery, and only the inner spare area ISA1 thereof is used from the inner periphery to the outer periphery. Accordingly, the start position of the respective area is determined according to a use direction of the area. However, this just corresponds to the use efficiency of the disc, and if the use direction of the respective area is changed, the start position of the area is also changed.

In a state that the use direction and the start position of the respective area of the disc are defined as described above, the method of indicating the SBM, which is changed according to the use status of the disc, will now be explained in detail.

Figures 7A, 7B:
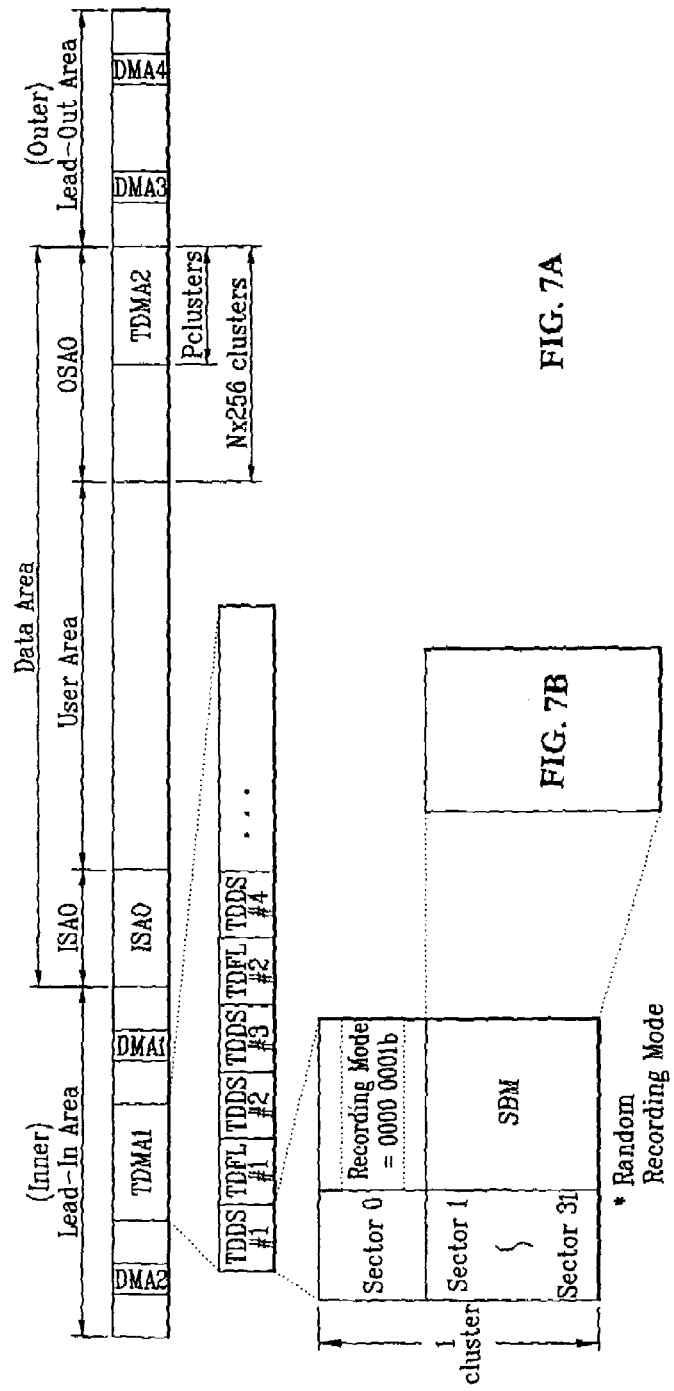
FIG. 7A illustrates the case where the SBM (space bit map) is recorded in the 31 leading sectors in a cluster, and the TDDS (temporary disc definition structure) is recorded in the remaining sector.
FIG. 7B illustrates an example of the data structure of the SBM.

As shown in FIG. 7A, the recording mode indicator in the TDDS indicates the random recording mode and the disc use status information is the SBM. FIG. 7B illustrates an example of the data structure of the SBM. As shown, the SBM includes three parts: a header for enabling recognition of the SBM, SBM information for directly indicating the SBM, and an SBM terminator for informing an end of the SBM.

The header, in addition to identifying this information field as an SBM, includes a recording layer information field and a format version field. The recording layer information field indicates which recording layer (e.g., layer number 0 or 1) the SBM is associated. The format version field indicates to which format version the SBM conforms.

The SBM information is prepared for each divided area of the disc as shown in FIG. 4B, and whether to update the SBM may be determined as needed by a user, a disc manufacturer or a host (hereinafter collectively referred to as a host). Specifically, the SBM information includes start position information (Start Cluster First PSN) of each area, length information of the corresponding area, and bitmap data for each area. In one example embodiment, the bitmap information is updated only once the start position information and the length information are set. This method is called an SBM on/off function, and is for actively coping with the diverse requests of the host. Also, in the case of the BD-WO, if the use environment corresponds to a real-time recording, defect management may not be performed. In this case, the spare area is not allocated and it is not required to update the SBM of the corresponding area.

Also, in one particular case, only the user area, which is an area where the user data is recorded, may be managed by the SBM, and the SBM will not be updated for changes to the other areas. Operating according to this embodiment is beneficial because if the SBM is updated whenever the management information is changed, frequent updates to the SBM may be required. This embodiment may prevent quickly using up the available TDMA area on the disc. Accordingly, if it is desired to perform the SBM updating of the user data area only using the SBM on/off function and not to update the remaining area, the start position information and the length information of the other areas are set to a specified value, for example, to a 'zero' value.

As will be appreciated, with each update of the SBM, a new SBM+TDDS data block is recorded in the TDMA, where the SBM provides a cumulative indication of the recordation status of the disc. As such, with each updating of the SBM, the TDDS is updated; particularly, to indicate the new position of the SBM.

Track Information Update Method

When to update the disc use status information may be a design parameter established according to the system or system designer. However, examples of events triggering update will be described in detail below.

When a new track is generated or a track is closed in the sequential recording mode, since the track information is newly generated, the track information may be updated. Similarly, when a new recordable area is changed during random recording, the SBM is updated. When a disc is ejected from a driver or the power to the driver is turned off, use of the disc is stopped at least temporarily. At these times, the track information is updated.

TDMA and DMA Recording Method

Figure 8:
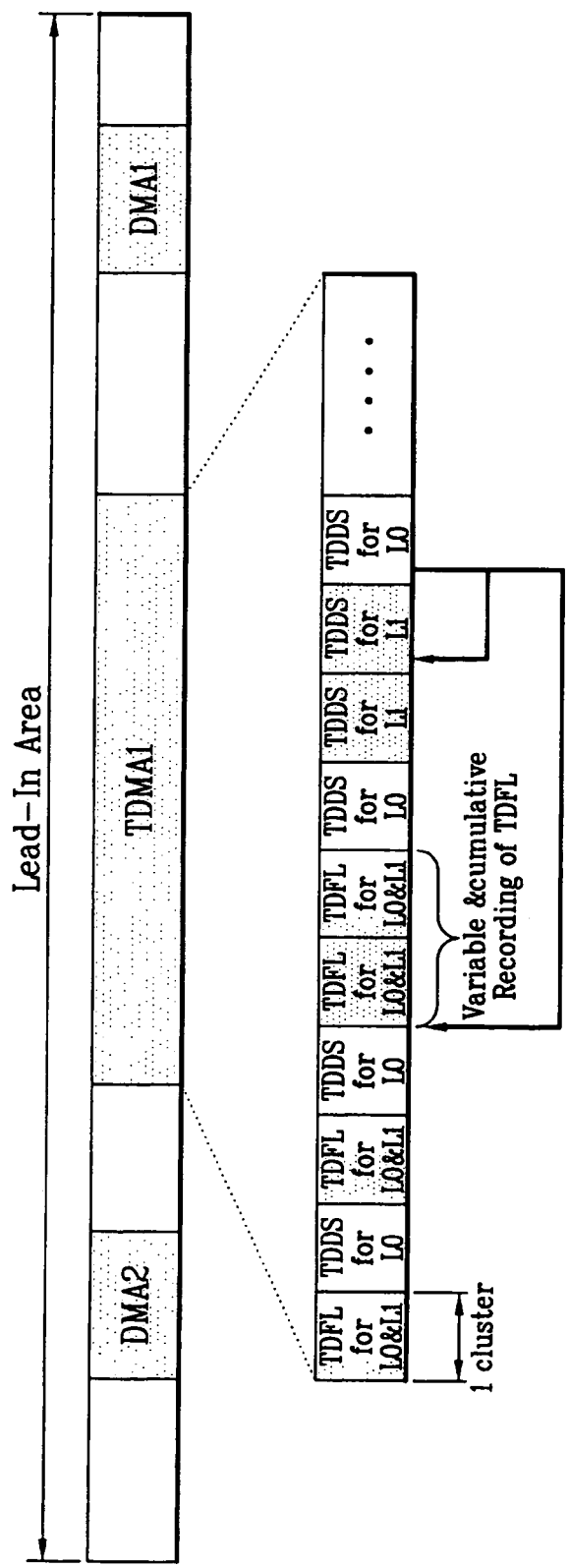
FIGS. 8 and 9 respectively illustrate exemplary embodiments of methods for recording information in a TDMA and DMA according to the present invention.
Figure 9:
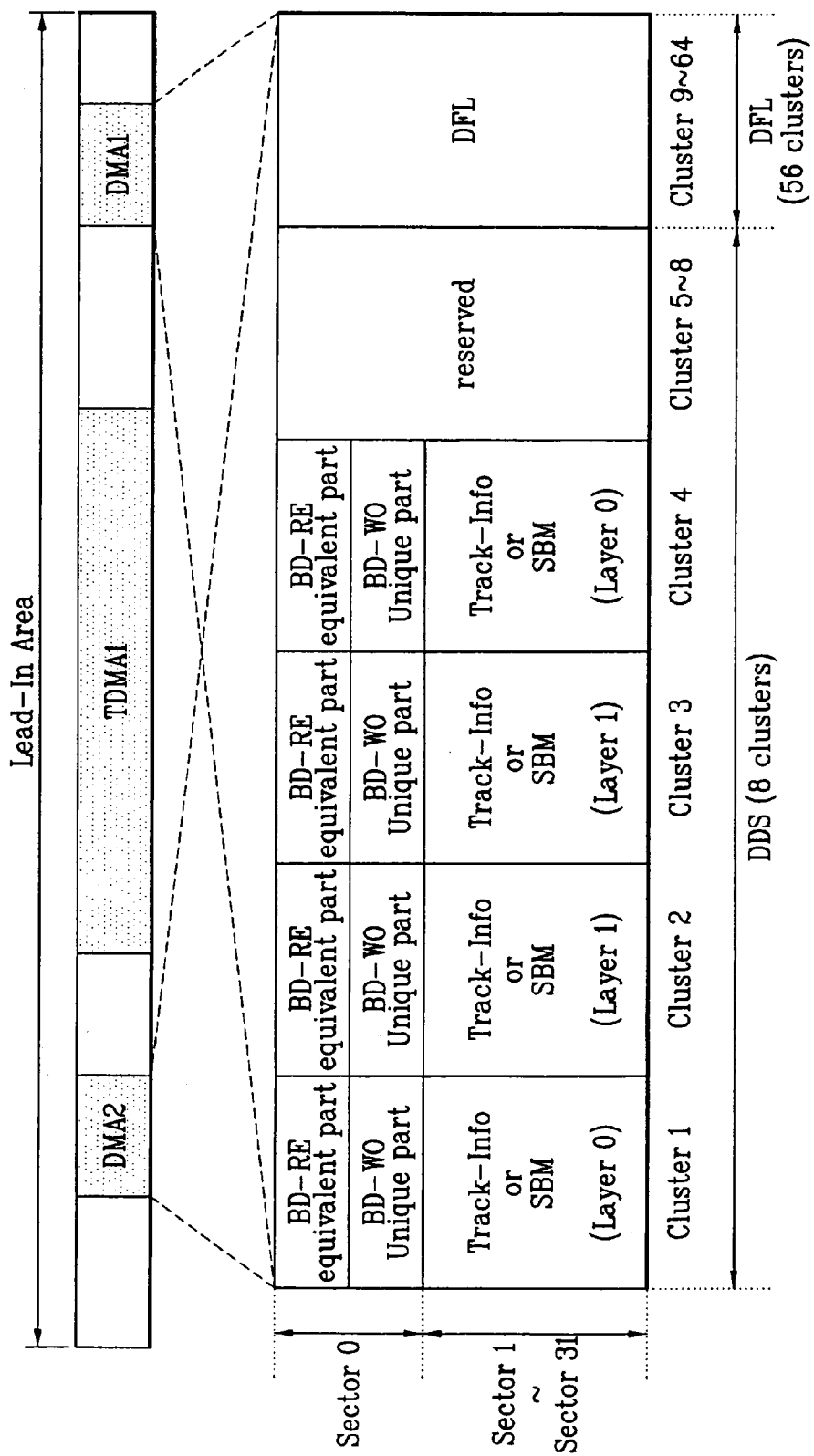

FIGS. 8 and 9 respectively illustrate exemplary embodiments of methods for recording information in a TDMA and DMA according to the present invention. FIG. 8 illustrates the method of recording the TDDS information, the disc use status information and the TDFL in the TDMA during the use of the disc, and FIG. 9 illustrates the method of transferring the final or most current version of the information recorded in TDMA to DMA if the disc is finalized.

FIG. 8 illustrates only the case of TDMA1, which exists in the lead-in area. However, it will be apparent that this method may also be performed in a TDMA that exists in another area of the disc. According to the present invention, the TDFL and the TDDS are recorded in the TDMA through the following method.

The TDFL is recorded and managed in the order of generation of the defect area irrespective of the recording layer, and has a variable size. That is, as the recording goes over cluster 1 due to an increase in defect areas, the TDFL may grow in size from one to eight clusters. The number of clusters is obtained considering the whole disc capacity when a multi-layer BD-WO is applied (e.g., 4 clusters for a single recording layer disc and 8 clusters for a dual recording layer disc).

Next, the TDDS having a fixed size, is dividedly recorded and managed for the multiple recording layers. Namely, a TDDS for each recording layer is recorded alternately after the TDFL as shown in FIG. 8. This corresponds to the fact that the 'track information' and the 'SBM', which are recorded with the TDDS, are dividedly recorded in the respective recording layers. Also, in the TDDS, an area is allocated so as to record therein 'position information (of 4bytes) of the newest TDFL' and the 'newest TDDS position information (of 4bytes) of other recording layers. Whenever the TDDS is updated, the above information is updated. Thus, by reading the TDDS information (irrespective of the recording layer) recorded last, all information on the corresponding disc, for example, the disc recording mode, newest use status information (track information or SBM), newest TDFL position information, newest TDDS position information of other recording layers may be confirmed to achieve an efficient management of the disc.

FIG. 9 illustrates the recording of data for only the case of DMA1 and DMA2, which exist in the lead-in area. However, it will be apparent that the recording method may also be performed in DMAs, which exist in another area of the disc.

First, the recording in the DMA may be performed when further recording is impossible (which may be occur when the TDMA or the spare area becomes full) or when the user, optionally, finalizes the disc. The contents recorded in the DMA are the final TDDS(with disc use status information)/TDFL information in the TDMA. This information is transferred as the DDS/DFL information of the DMA. Accordingly, the TDDS/TDFL information is recorded in the DDS/DFL as it is without any change of the recorded contents. The DDS/DFL means the final record of the disc in the DMA, and has the same structure and contents as the TDDS/TDFL.

According to the present invention, the DDS and the DFL are recorded through the following method.

The DMA according to one example embodiment of the present invention includes 64 clusters in the case of the multiple recording layers. The 8 leading clusters provide an area for recording the DDS information, and the 54 remaining clusters provide an area for recording the DFL information.

The DDS in the DMA has the same structure as the TDDS. In the upper sector 1 of the cluster 1 of the DDS, an area for recording the same information as that used in the BD-RE, and an area for recording information used only in the BD-WO (for example, disc recording mode, newest use status information (track information or SBM), newest TDFL position information, newest TDDS position information of other recording layers, etc.) is provided. In the 31 remaining sectors, the 'track information' or 'SBM' determined in association with the recording mode as the disc use status information are dividedly recorded in the respective recording layers.

Also, a sequential recording is performed in the order of the TDDS of the first recording layer (TDDS for L0) and the TDDS of the second recording layer (TDDS for L1), and then a repeated recording is performed in the order of the TDDS of the second recording layer (TDDS for L1) and the TDDS of the first recording layer (TDDS for L0). This recording method account for the actual structure of the disc and prepares against the possibility of damaging the DMA information due to the direction (mainly, horizontal direction) of a scratch on the disc.

Also, since the DFL in the DMA has the same contents as the final TDFL and the TDFL is recorded using 8 clusters at maximum, the repeated recording thereof can be performed as many times as required by a system. At this time, the number of times of repetition is 7 at maximum.

As described above, the method of recording management information on an optical disc write once according to the present invention enables a selective recording of the disc use status information ('track information' and 'SBM') according to the determined recording mode, and enables an efficient recoding of the information in TDMA and DMA, and thus an efficient and progressive disc use can be achieved.

Figure 10:
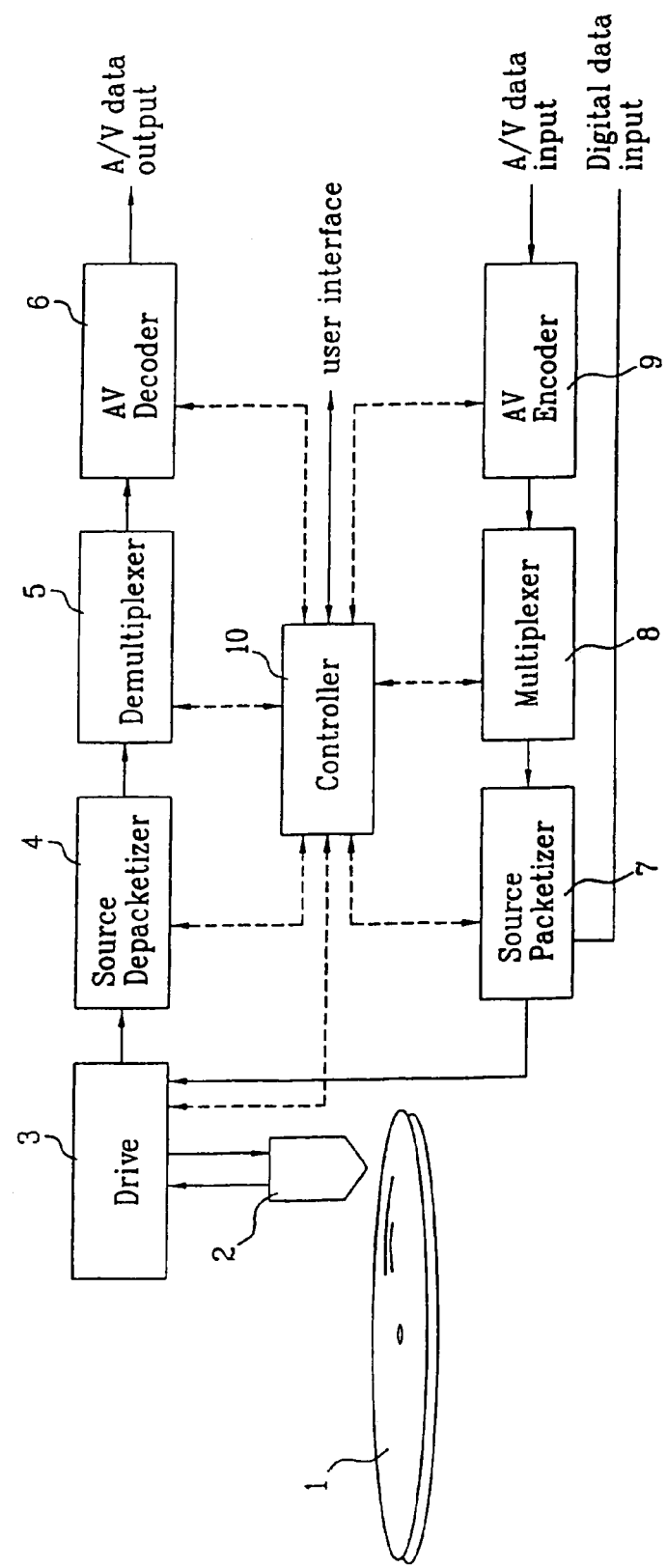
FIG. 10 illustrates an embodiment of a recording and reproducing apparatus according to the present invention.

FIG. 10 illustrates a schematic diagram of an embodiment of an optical disk recording and reproducing apparatus according to the present invention. As shown, an encoder 9 receives and encodes data (e.g., still image data, audio data, video data, etc.). The encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 10, the operations of the encoder 9, the multiplexer 8 and the source packetizer 7 are controlled by a controller 10. The controller 10 receives user input on the recording operation, and provides control information to encoder 9, multiplexer 8 and the source packetizer 7. For example, the controller 10 instructs the encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, the controller 10 controls the drive 3 to record one or more of the data structures of FIGS. 1-9 on the optical disk and perform the recording and reproducing methods described above.

During reproduction or further recording operations, the controller 10 may control the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce and/or record data from/to the optical disk as discussed in detail above.

Reproduced source packets are received by a source depacketizer 4 and converted into a data stream (e.g., an MPEG-2 transport packet stream). A demultiplexer 5 demultiplexes the data stream into encoded data. A decoder 6 decodes the encoded data to produce the original data that was fed to the encoder 9. During reproduction, the controller 10 controls the operation of the source depacketizer 4, demultiplexer 5 and decoder 6. The controller 10 receives user input on the reproducing operation, and provides control information to decoder 6, demultiplexer 5 and the source packetizer 4. For example, the controller 10 instructs the decoder 9 on the type of decoding to perform, instructs the demultiplexer 5 on the transport stream to demultiplex, and instructs the source depacketizer 4 on the source packet format.

While FIG. 10 has been described as a recording and reproducing apparatus, it will be understood that only a recording or only a reproducing apparatus may be provided using those portions of FIG. 10 providing the recording or reproducing function.

The write-once optical disc management data structure and method of recording and reproducing this data structure as well as updating the management data provide information regarding the use of the recording medium to store data.

The data structure for and method for managing at least a data area of a high-density recording medium in accordance with embodiments of the present invention enables an efficient and progressive use of a write-once recording medium such as BD-WO.

As apparent from the above description, the present invention also provides apparatuses for recording a data structure on a high density recording medium for managing at least a data area of the recording medium.

While the invention has been disclosed with respect to a limited number of embodiments, those skilled in the art, having the benefit of this disclosure, will appreciate numerous modifications and variations there from. For example, while described with respect to a Blu-ray Write-Once optical disk in several instances, the present invention is not limited to this standard of optical disk or to optical disks. It is intended that all such modifications and variations fall within the spirit and scope of the invention.

What is claimed is:

1. A recording medium having a data structure for managing a data area of the recording medium, comprising:
a management area storing a data block, the data block including first information indicating a recording mode of the recording medium and second information indicating use status of the data area;
wherein the recording mode is determined to be one of a sequential recording mode and a random recording mode during initializing the recording medium, and a type of the second information is determined based on the recording mode, and the second information is recorded in the management area until the recording medium is finalized.

2. The recording medium of claim 1, wherein if the recording mode is determined to be the sequential recording mode, the type of the second information is sequential recording information providing information on continuous recording areas in a data area of the recording medium.

3. The recording medium of claim 2, wherein the sequential recording information includes a header, information entries for each continuous recording area and a terminator, the header identifying the sequential recording information as sequential recording information, each information entry providing information on an associated continuous recording area, and the terminator indicating an end of the sequential recording information.

4. The recording medium of claim 3, wherein the header information indicates a number of the continuous recording areas.

5. The recording medium of claim 4, wherein the header information indicates a number of the continuous recording areas open for recording.

6. The recording medium of claim 3, wherein the header information indicates a number of the continuous recording areas open for recording.

7. The recording medium of claim 3, wherein each information entry indicates whether the associated continuous recording area is a first continuous recording area in a group of continuous recording areas.

8. The recording medium of claim 3, wherein each information entry indicates whether the associated continuous recording area is open for recording.

9. The recording medium of claim 3, wherein each information entry indicates a starting physical sector number of the associated continuous recording area.

10. The recording medium of claim 3, wherein each information entry indicates a last recording address of the associated continuous recording area.

11. The recording medium of claim 3, wherein each information entry indicates a status of the associated continuous recording area, indicates a starting physical sector number of the associated continuous recording area, and indicates a last recording address of the associated continuous recording area.

12. The recording medium of claim 11, wherein the status indicates whether the associated continuous recording area is a start of a group of continuous recording areas.

13. The recording medium of claim 1, wherein if the recording mode is determined to be the random recording mode, the type of the second information is a space bit map indicating recordation status of a data area of the recording medium.

14. The recording medium of claim 13, wherein the space bit map includes space bit map data, a data pointer pointing to the space bit map data, and a length indicator indicating a length of the space bit map data.

15. The recording medium of claim 14, wherein the data pointer indicates a first physical sector number of the space bit map data.

16. The recording medium of claim 14, wherein the space bit map data includes a status indicator associated with each recording unit of the data area, the status indicator indicating whether data is recorded in the associated recording unit.

17. The recording medium of claim 16, wherein the recording unit is a cluster.

18. The recording medium of claim 14, wherein the space bit map further includes a format indicator indicating a format of the space bit map.

19. The recording medium of claim 14, wherein
the recording medium is a dual layer optical disc; and
the space bit map further includes a layer indicator indicating a layer to which the space bit map corresponds.

20. A method of initializing a recording medium, comprising:
determining a recording mode for the recording medium, the recording mode being one of a sequential recording mode and a random recording mode;
determining use status information based on the determined recording mode; and
recording an indicator of the determined recording mode in a management area of the recording medium,
wherein the determined use status information is updated in the management area until the recording medium is finalized.

21. The method of claim 20, further comprising:
recording sequential recording information as the use status information in the management area if the recorded recording mode indicator indicates the sequential recording mode, the sequential recording information providing information on continuous recording areas in a data area of the recording medium.

22. The method of claim 20, further comprising:
recording a space bit map as the use status information in the management area if the recorded recording mode indicator indicates the random recording mode, the space bit map provides information on a recordation status of a data area of the recording medium if the recorded recording mode indicator indicates a random recording mode.

23. A method of recording management information on a recording medium, comprising:
reproducing a recording mode indicator from a management area of the recording medium;
judging a recording mode of the recording medium based on the recording mode indicator; and
recording use status information for the recording medium in the temporary defect management area based on the judging step, the use status information providing information on use of a data area of the recording medium to store data;
wherein the recording mode is determined to be one of a sequential recording mode and a random recording mode during initializing the recording medium, and a type of the use status information is determined based on the recording mode, and the use status information is recorded in the management area until the recording medium is finalized.

24. The method of claim 23, wherein the use status information is sequential recording information that provides information on continuous recording areas in the data area of the recording medium if the judging step judges that the reproduced recording mode indicator indicates a sequential recording mode.

25. The method of claim 23, wherein the use status information is a space bit map that provides information on a recordation status of the data area if the judging step judges that the reproduced recording mode indicator indicates a random recording mode.

26. A method of recording management data on a recording medium, comprising:
recording a data block in a temporary defect management area, the data block including a temporary definition structure including a recording mode of the recording medium, and the data block including use status information indicating use status of the data area;
wherein the recording mode is determined to be one of a sequential recording mode and a random recording mode during initializing the recording medium, and a type of the use status information is determined based on the recording mode, and the use status information is recorded in the temporary defect management area until the recording medium is finalized.

27. A method of reproducing data from a recording medium, comprising:
reproducing at least a portion of data recorded on the recording medium based on a data block recorded in a temporary defect management area of the recording medium, the data block including a temporary definition structure and use status information;
wherein the temporary definition structure includes a recording mode of the recording medium, and a type of the use status information is determined based on the recording mode during initializing the recording medium, and the use status information is recorded in the temporary defect management area until the recording medium is finalized.

28. An apparatus for recording management data on a recording medium, comprising:
an optical recording device configured to record data on the recording medium; and
a controller, operatively coupled to the optical recording device, configured to control the optical recording device to record a data block in a management area, the data block including first information indicating a recording mode of the recording medium and second information indicating use status of the data area;
wherein the recording mode is determined to be one of a sequential recording mode and a random recording mode during initializing the recording medium, and a type of the second information is determined based on the recording mode, and the second information is recorded in the management area until the recording medium is finalized.

29. The apparatus of claim 28, wherein the optical recording device is an optical pick-up.

30. The apparatus of claim 28, wherein if the recording mode is determined to be the sequential recording mode, the type of the second information is determined to be sequential recording information providing information on a continuous recording area in a data area of the recording medium.

31. The apparatus of claim 28, wherein if the recording mode is determined to be the random recording mode, the type of the second information is determined to be a space bit map indicating recordation status of a data area of the recording medium.

32. An apparatus for reproducing data from a recording medium, comprising:
an optical pickup configured to read data from the recording medium; and
a controller, operatively coupled to the optical pickup, configured to control reproducing at least a portion of data recorded on the recording medium based on a data block recorded in a management area of the recording medium, the data block including first information indicating a recording mode of the recording medium and second information indicating use status of the recording medium;

wherein the recording mode is determined to be one of a sequential recording mode and a random mode during initializing the recording medium, and a type of the second information is determined based on the recording mode, and the second information is recorded in the management area until the recording medium is finalized.

33. The apparatus of claim 32, wherein if the recording mode is determined to be the sequential recording mode, the type of the second information is determined to be sequential recording information providing information on a continuous recording area in a data area of the recording medium.

34. The apparatus of claim 32, wherein if the recording mode is determined to be the random recording mode, the type of the second information is determined to be a space bit map indicating recordation status of a data area of the recording medium.

* * * * *